(12) United States Patent
Suzuki

(10) Patent No.: US 6,755,210 B2
(45) Date of Patent: Jun. 29, 2004

(54) MASS FLOW CONTROLLER

(75) Inventor: Isao Suzuki, Tokyo (JP)

(73) Assignee: MKS Japan, Inc., Tokyo (JP)

( * ) Notice: Subject to any disclaimer, the term of this patent is extended or adjusted under 35 U.S.C. 154(b) by 90 days.

(21) Appl. No.: 10/026,519

(22) Filed: Dec. 27, 2001

(65) Prior Publication Data
US 2002/0088493 A1 Jul. 11, 2002

Related U.S. Application Data

(63) Continuation-in-part of application No. 09/951,625, filed on Sep. 14, 2001, now abandoned.

(30) Foreign Application Priority Data

Dec. 28, 2000 (JP) ........................................ 2000-402073

(51) Int. Cl.[7] ................................................. G05D 7/06
(52) U.S. Cl. ............... 137/487.5; 137/486; 137/599.13; 251/129.02; 251/129.21; 73/861.61
(58) Field of Search ............................. 137/486, 487.5, 137/599.11, 599.13; 251/129.02, 129.15, 129.21; 73/204.25, 204.27, 861.61; 700/282

(56) References Cited

U.S. PATENT DOCUMENTS

| 3,762,683 | A | * | 10/1973 | Sangl | 251/129.21 |
|---|---|---|---|---|---|
| 3,918,305 | A | * | 11/1975 | Benedict | 73/861.61 |
| 4,130,017 | A | * | 12/1978 | Benedict et al. | 73/861.61 |
| 4,562,744 | A | * | 1/1986 | Hall et al. | 73/861.02 |
| 4,790,351 | A | * | 12/1988 | Kervagoret | 137/596.17 |
| 4,791,958 | A | * | 12/1988 | Brundage | 137/528 |
| 4,969,629 | A | * | 11/1990 | Athanassiu | 251/331 |
| 4,986,135 | A | * | 1/1991 | Corser et al. | 73/861.42 |
| 5,158,263 | A | * | 10/1992 | Shimizu et al. | 251/129.21 |
| 5,159,951 | A | * | 11/1992 | Ono et al. | 137/486 |
| 5,410,912 | A | * | 5/1995 | Suzuki | 73/204.15 |
| 5,911,238 | A | * | 6/1999 | Bump et al. | 137/487.5 |

* cited by examiner

Primary Examiner—Ramesh Krishnamurthy
(74) Attorney, Agent, or Firm—Wenderoth, Lind & Ponack, L.L.P.

(57) ABSTRACT

The present invention provides a high-performance mass flow controller which is compact and lightweight, which has a flow path having a simple structure and which does not have dead space in which a fluid is likely to stagnate and cause the problem of contamination. A cylindrical valve conduit having a hollow structure, a yoke and a sensor conduit are connected in tandem. A fluid inlet portion is connected to an end of the valve conduit and a fluid outlet portion is connected to an end of the sensor conduit. A solenoid valve is provided on a side of the fluid inlet portion and a thermal mass flowmeter is provided on a side of the fluid outlet portion. In the valve conduit, a cylindrical plunger providing a movable portion of the solenoid valve and a valve portion of which a degree of opening is adjusted by moving the plunger are provided on a side of the fluid inlet portion. A bypass for generating a laminar flow is disposed in the sensor conduit so as to effect one-way flow of a fluid.

12 Claims, 16 Drawing Sheets

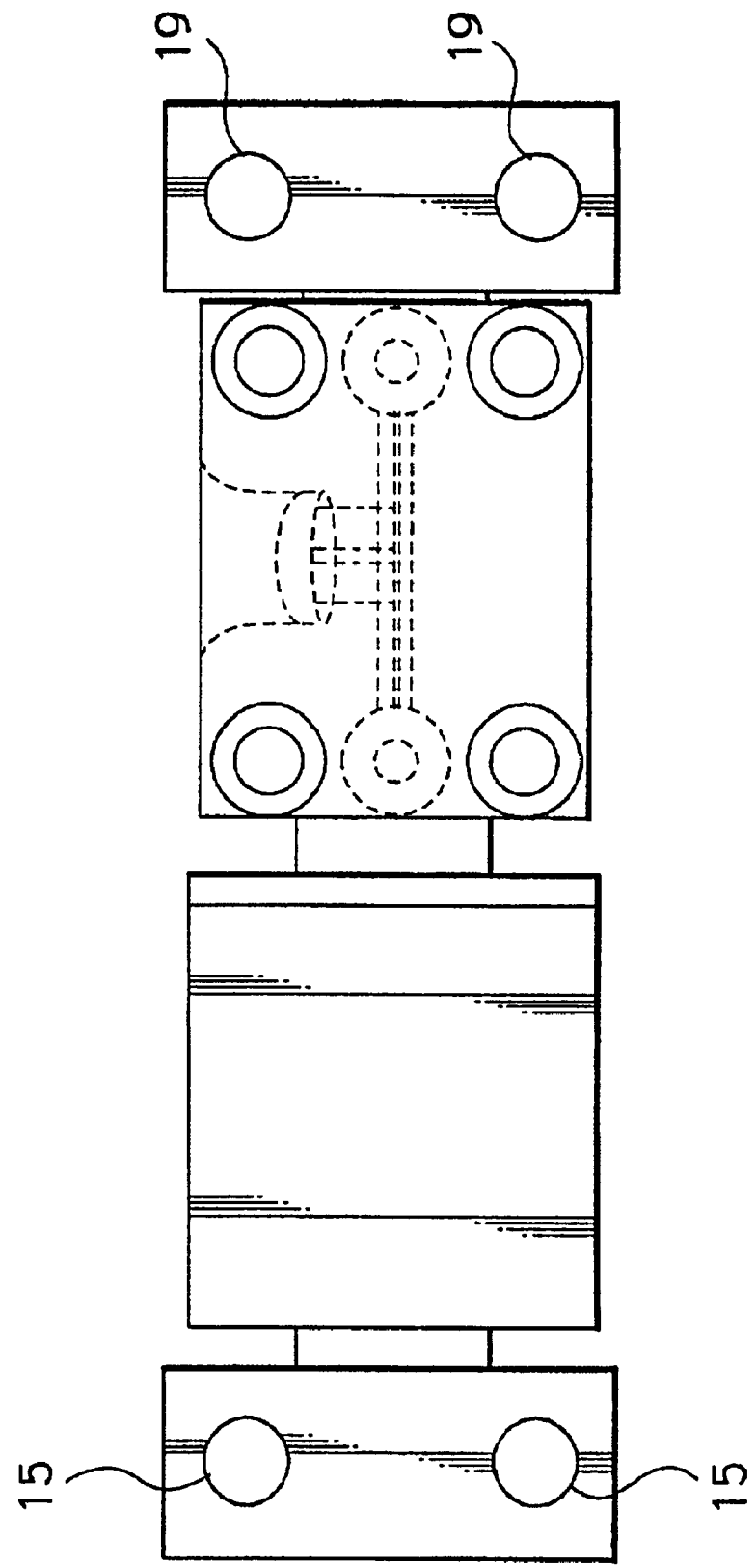

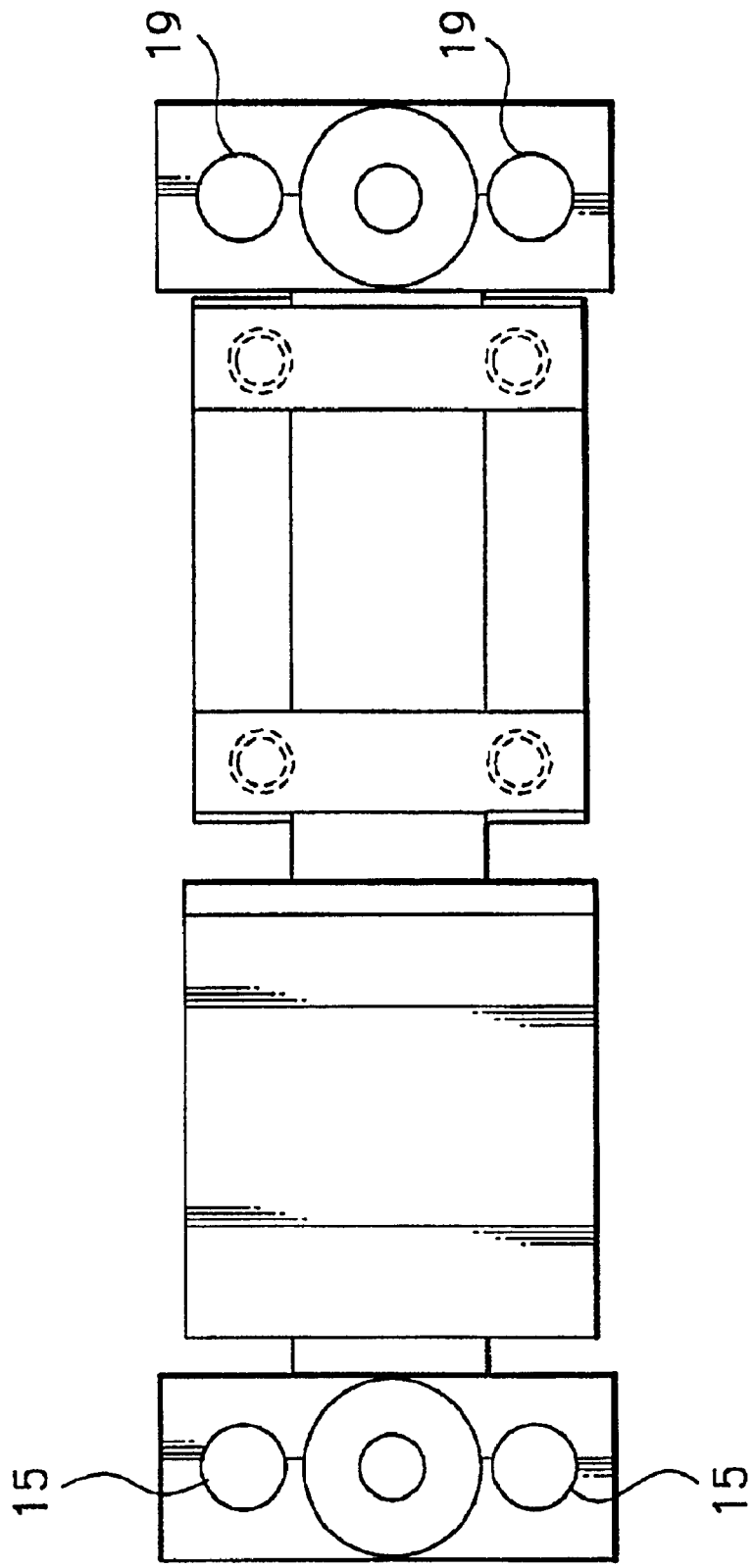

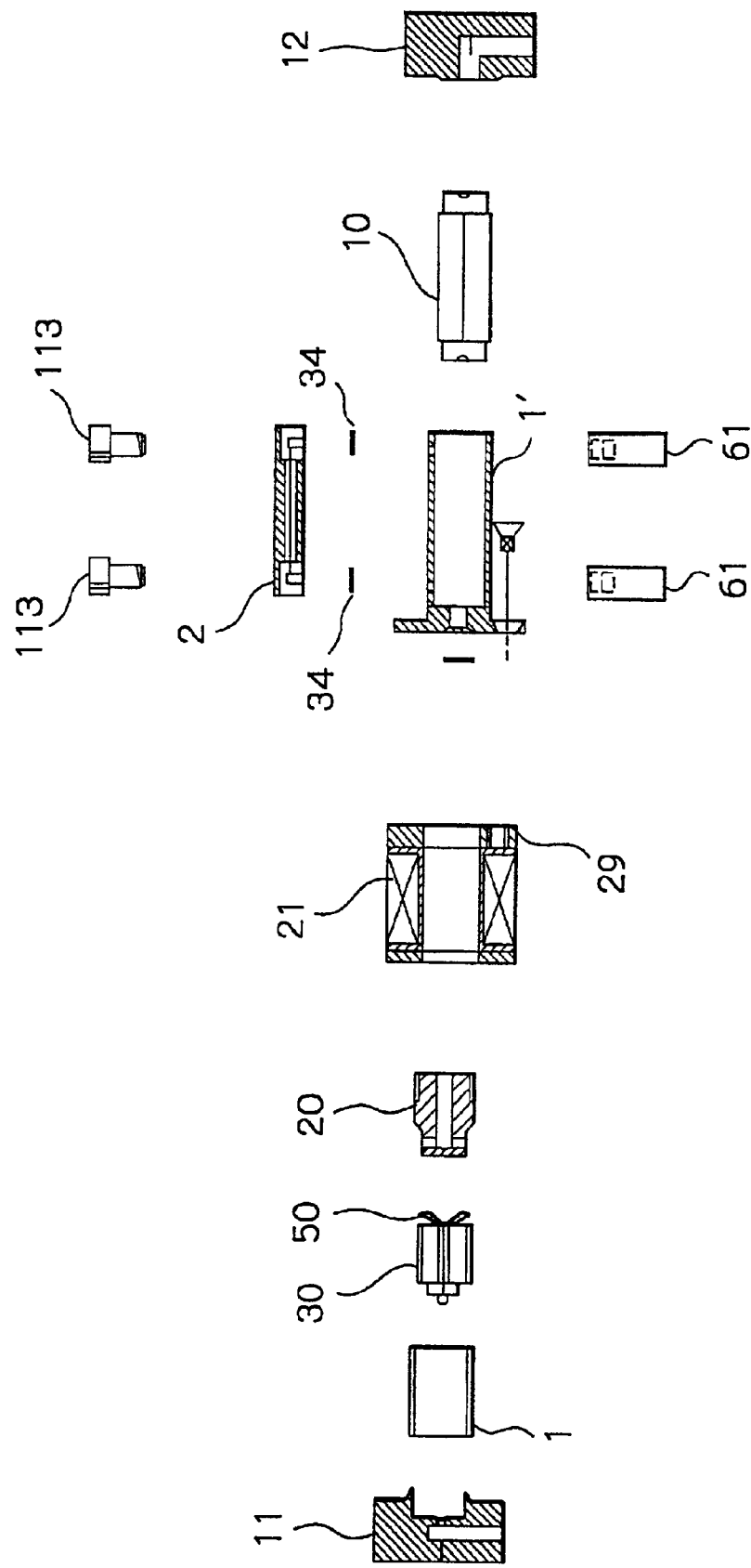

MASS FLOW CONTROLLER

This is a continuation-in-part application of U.S. patent application Ser. No. 09/951,625 filed on Sep. 14, 2001, now abandoned.

BACKGROUND OF THE INVENTION

The present invention relates to a mass flow controller which is used in, for example, a semiconductor manufacturing process.

In a semiconductor manufacturing apparatus, a mass flow controller is used for controlling a fluid such as a process gas and a liquid material. This mass flow controller provides a fluid supply system, together with filters and valves. With respect to such a fluid supply system, reduction in size and weight of the system has been desired, in order to improve performance by, for example, suppressing an escape of gas and reduce the cost of the semiconductor manufacturing apparatus.

Conventionally, components of the fluid supply system are connected by means of pipe joints. However, in order to reduce the size of the fluid supply system, it has been proposed to connect base portions of the components by a common connecting method using flanges. In this connecting method using flanges, although the size of the fluid supply system can be reduced, a fluid control system has a high component density while the weight thereof remains unchanged. Further, because many flanges are used for connecting the components, the fluid supply system becomes a metallic mass, and even the weight of the fluid supply system as a whole increases.

In the conventional connecting method using pipe joints, a base portion of the mass flow controller is produced by cutting a metal. Therefore, the mass flow controller has a large weight and is difficult to manufacture in mass production, leading to difficulty in cost reduction.

SUMMARY OF THE INVENTION

The present invention has been made, in order to solve the above-mentioned problems accompanying the conventional connecting methods with respect to the mass flow controller. It is an object of the present invention to provide a high-performance mass flow controller which is compact and lightweight, which has a fluid flow path having a simple structure and which does not have dead space in which a fluid is likely to stagnate and cause the problem of contamination.

The present invention provides a mass flow controller for controlling a mass flow rate in a predetermined range, in which a mass flow rate of a fluid is detected by a flow rate sensor and a control valve is operated so as to adjust the detected mass flow rate to a desired value. The control valve is arranged as a solenoid valve operated by means of a solenoid, and a plunger for opening and closing the solenoid valve is disposed within a cylindrical conduit having a hollow structure, whereby one-way flow of the fluid is effected in a space between an outer circumferential surface of the plunger and an inner circumferential surface of the conduit in a direction of the axis of the cylindrical conduit.

In one embodiment of the present invention, the outer circumferential surface of the plunger includes a groove extending in parallel to the axis of the conduit, to thereby provide a fluid flow path.

In another embodiment of the present invention, the plunger is made of a magnetic alloy having high anti-corrosion properties.

In a further embodiment of the present invention, the control valve comprises a spherical valve head attached to a forward end of the plunger and a valve seat corresponding to the valve head. The valve seat is arranged in a funnel-like form.

In a further embodiment of the present invention, a cylindrical yoke for guiding a magnetic flux generated by the solenoid is disposed in the conduit at a position adjacent to the plunger, which yoke is movable in the direction of the axis of the conduit, whereby an initial position of a valve head of the solenoid valve and an attractive force of an electromagnet can be adjusted by adjusting a gap between the plunger and the yoke.

In a further embodiment of the present invention, a spherical valve head is attached to one end of the plunger and a yoke having a funnel-like valve seat corresponding to the valve head is disposed adjacent to the plunger with a spring being provided therebetween, to thereby obtain a normally opened valve structure.

In a further embodiment of the present invention, a doughnut-like permanent magnet is positioned at an outer circumferential surface of the conduit at a position corresponding to the plunger, which doughnut-like permanent magnet is adjustable in terms of a position with respect to the direction of the axis of the conduit, whereby an initial axial position of the plunger when the solenoid is deenergized can be adjusted by adjusting the position of the doughnut-like permanent magnet.

In a further embodiment of the present invention, the flow rate sensor comprises a thermal mass flow rate sensor connected in parallel with the conduit.

In a further embodiment of the present invention, the flow rate sensor is arranged as a pressure based flow rate sensor. The pressure based flow rate sensor comprises a pressure gauge provided in the fluid flow path, so as to detect a pressure caused by a change in flow rate.

The foregoing and other objects, features and advantages of the present invention will be apparent from the following detailed description and appended claims taken in connection with the accompanying drawings.

BRIEF DESCRIPTION OF THE DRAWINGS

FIG. 2 is a plan view of the mass flow controller in the first embodiment of the present invention.

FIG. 3 is a bottom view of the mass flow controller in the first embodiment of the present invention.

FIG. 4 is a disassembled view of the mass flow controller in the first embodiment of the present invention.

FIG. 5b is a view taken in a direction indicated by an arrow A in FIG. 5a.

DETAILED DESCRIPTION OF THE INVENTION

Hereinbelow, referring to the accompanying drawings, a mass flow controller of the present invention is described.

Figure 1:
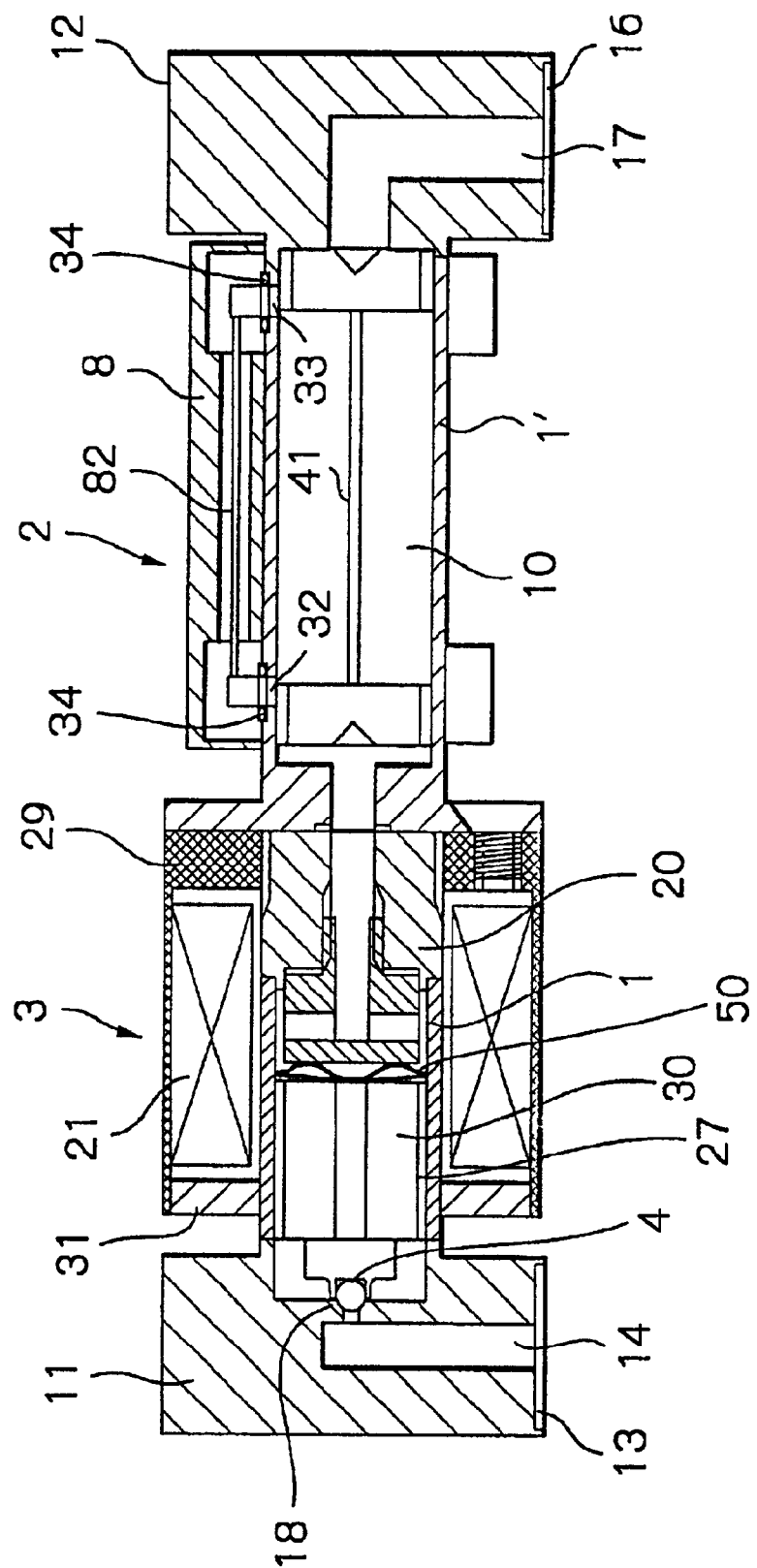
FIG. 1 is a side cross-sectional view of a mass flow controller in a first embodiment of the present invention.

FIGS. 1 to 4 show a mass flow controller in a first embodiment of the present invention. FIG. 1 is a side cross-sectional view, FIG. 2 is a plan view, FIG. 3 is a bottom view and FIG. 4 is a disassembled view.

That is, the mass flow controller in this embodiment comprises a cylindrical valve conduit 1, a yoke 20 and a sensor conduit 1' connected in tandem. A fluid inlet portion 11 is connected to an end of the valve conduit 1 and a fluid outlet portion 12 is connected to an end of the sensor conduit 1'. A solenoid valve 3 is provided on a side of the fluid inlet portion 11 and a thermal mass flowmeter 2 is provided on a side of the fluid outlet portion 12.

In the valve conduit 1, a cylindrical plunger 30 providing a movable portion of the solenoid valve 3 and a valve portion of which a degree of opening is adjusted by moving the plunger 30 are provided on a side of the fluid inlet portion 11. A bypass 10 for generating a laminar flow is disposed in the sensor conduit 1' so as to effect one-way flow of a fluid.

The valve conduit 1 is in the form of a cylinder having an outer diameter of about 10 mm. The valve conduit 1 is connected to an end of the fluid inlet portion 11 by welding. The plunger 30, which is inserted into the valve conduit 1, is made of a magnetic alloy having high anti-corrosion properties. A spherical valve head 4 is attached to a forward end of the plunger 30. A leaf spring 50 is connected to a rear end of the plunger 30 by welding so as to hold the plunger 30 in a coaxial relationship to the valve conduit 1 and bias the plunger 30 toward the fluid inlet portion 11. The leaf spring 50 is slightly corrugated as a corrugated washer. The leaf spring has a spring constant of about the square of an amount of displacement and is suitable for use as a spring for a solenoid type control valve. A cylindrical surface of the plunger 30 includes grooves 27 extending in a direction of the axis of the valve conduit. The grooves 27 serve to effect a smooth flow of a fluid and prevent occurrence of a turbulent flow when a fluid flows at a high velocity, thus ensuring a stable movement of the plunger 30.

Figure 5A:
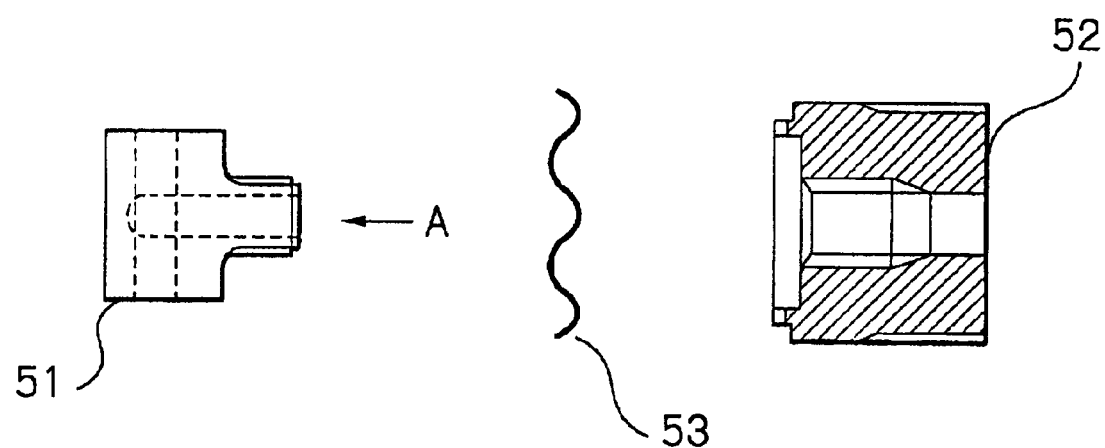
FIG. 5a is a disassembled view of a yoke in the mass flow controller in the first embodiment of the present invention.
Figure 5B:
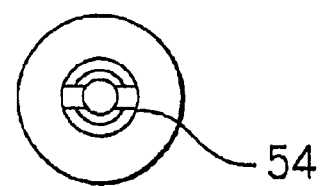

Further, a cylindrical magnetic member providing the yoke 20 for the solenoid valve is connected to the valve conduit 1 by welding, in proximity to the plunger 30 on a side of the fluid outlet portion. The yoke 20 includes a through-hole extending radially through a side surface close to an end thereof facing the plunger 30. The through-hole communicates with a hole extending from the other end of the yoke 20, thereby providing a fluid flow path. By this arrangement of the flow path, a fluid can be caused to smoothly flow in a direction from an outer circumferential surface of the plunger to the yoke, regardless of a gap between the plunger 30 and the yoke 20. FIG. 5a is a disassembled view showing a detail of the yoke 20. The yoke 20 comprises an adjusting yoke 51 disposed on a side facing the plunger 30 and a fixed yoke 52 disposed on a side of the fluid outlet portion. The adjusting yoke 51 is threadably engaged with the fixed yoke 52 with a spring washer 53 being provided therebetween. As shown in FIG. 5b, a slot 54 is formed in an end face of a threaded portion of the adjusting yoke 51. A driver is inserted from the direction of the fluid outlet portion into a threaded hole of the fixed yoke 52, and the adjusting yoke 51 is rotated by rotating the slot 54, to thereby adjust a gap between the adjusting yoke 51 and the plunger 30, that is, an initial position of the plunger. The adjustment of the initial position of the plunger can be conducted even after welding of the valve conduit 1. This ensures that a desired flow rate control range can be accurately obtained, and is especially useful in providing a valve having a low flow rate, in which valve a flow rate control range is affected to a large extent by the initial position of the plunger. Although the yoke 20 comprises two components in this embodiment, the yoke 20 as a whole may comprise one integral body.

The fluid inlet portion 11 comprises a mounting flange comprising a block in the form of an elongated cube. A circular recess 13 is formed in one side surface of the fluid inlet portion 11 and a hole 14 extends from a central portion of the recess 13 so as to permit flow of a fluid in the fluid inlet portion. The hole 14 becomes narrow at a central portion of the fluid inlet portion 11 and extends perpendicularly therefrom (in a rightward direction in FIG. 1). An exit of the hole 14 is cut in a generally funnel-like form, thus providing a valve seat 18. Two through-holes 15 (see FIGS. 2 and 3) are formed so as to extend from an upper surface to a bottom surface of the fluid inlet portion 11. Bolts can be inserted to extend through the through-holes 15, in order to connect the fluid inlet portion 11 to other components of the fluid supply system.

The fluid outlet portion 12 comprises a mounting flange comprising a block in the form of an elongated cube. A circular recess 16 is formed in one side surface of the fluid outlet portion 12 and a hole 17 extends from a central portion of the recess 16 so as to permit flow of a fluid in the fluid outlet portion. The hole 17 changes its direction at a central portion of the fluid outlet portion 12 and extends perpendicularly therefrom (in a leftward direction in FIG. 1). Two through-holes 19 (see FIGS. 2 and 3) are formed so as to extend through an upper surface to a bottom surface of the fluid outlet portion 12. Bolts can be inserted to extend through the through-holes 19, in order to connect the fluid outlet portion 12 to other components of the fluid supply system.

A solenoid 21 is provided at an outer circumferential surface of the valve conduit 1 at a position in which the plunger 30 and the yoke 20 are provided. The solenoid 21 is in a bobbin-like form and fixedly provided in a solenoid case 29. The solenoid case 29 is in the form of a cylinder having an end wall on one end thereof. The other end of the solenoid case 29 is covered with a case cover 31.

The sensor conduit 1' in a generally cylindrical form is connected to the fluid outlet portion 12 by welding. The cylindrical bypass 10 is press-fitted into the sensor conduit 1' so as to generate a laminar flow of a fluid. The cylindrical bypass 10 is in the form of a cylinder having a plurality of grooves 41 formed in a surface thereof. The grooves 41 extend in parallel to a direction of the axis of the sensor conduit. A fluid flows in these grooves, to thereby generate a laminar flow. V-shaped grooves are formed in a front face and a rear face of the bypass 10 so that the fluid easily diffuses toward the grooves and is easily collected toward the hole 17 due to radial flow. One end of the sensor conduit 1' is in the form of a flange and fixed to an end face of the solenoid case 29 through an O-ring by means of screws. Thus, the sensor conduit 1' is connected to the valve conduit 1.

Figure 6:
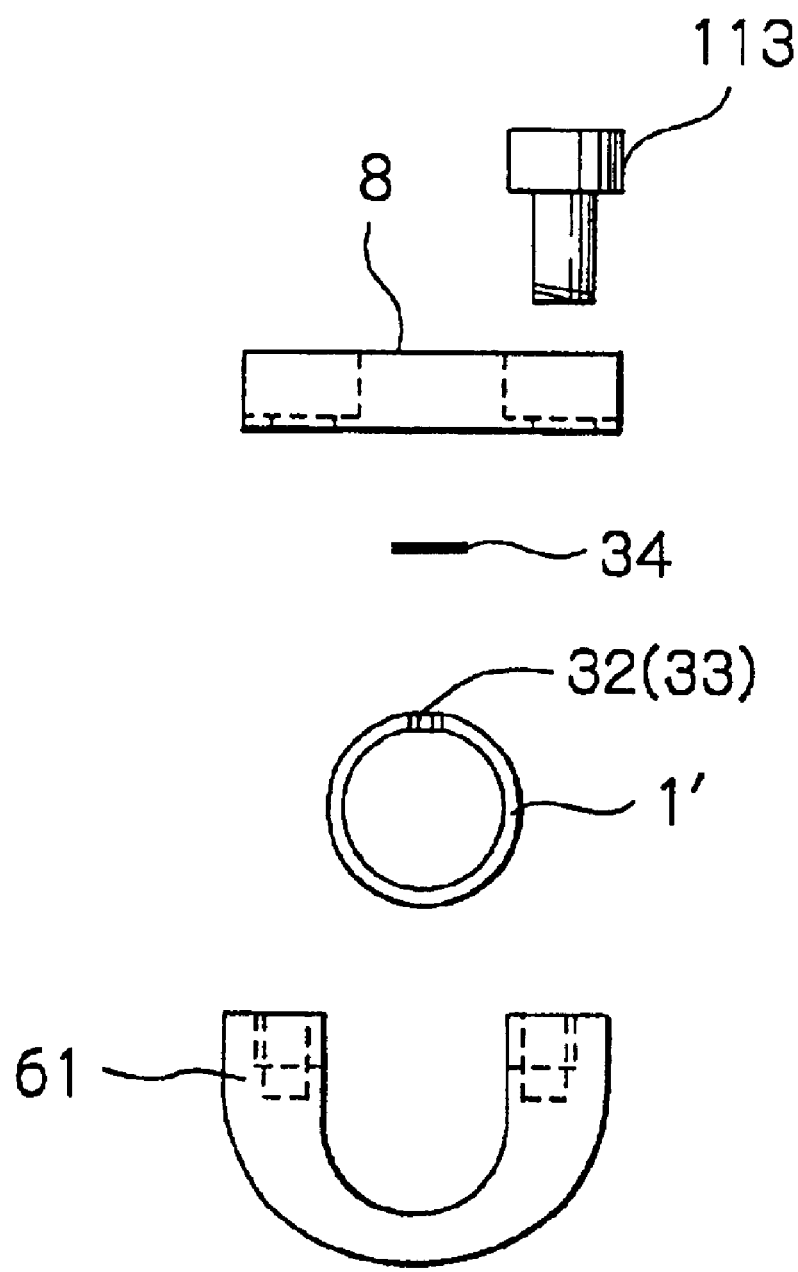
FIG. 6 is a disassembled view of a sensor fixing portion in the mass flow controller in the first embodiment of the present invention.

In a side surface of the sensor conduit 1' at a position in which the cylindrical bypass 10 is provided, a sensor inlet opening 32 and a sensor outlet opening 33 are formed, so as to enable a part of the flow of the fluid to be branched off toward the thermal flowmeter 2. That is, as shown in FIG. 6, a sensor unit 8 in a platy form is fixed to an upper side of the sensor conduit 1' by means of bolts 113 in a manner such that the sensor inlet opening 32 and the sensor outlet opening 33 of the sensor conduit 1' are connected to a sensor tube 82 in the sensor unit 8. To fix the sensor unit 8, two U-shaped sensor fixing members 61 are disposed so as to surround the sensor conduit 1' from a lower side thereof, and the sensor unit 8 is attached to the U-shaped sensor fixing members 61 by means of the bolts 113. O-ring seals 34 are provided between the sensor tube 82 and the sensor inlet and outlet openings 32 and 33, to thereby seal a flow path. The flow rate detected by the flowmeter 2 is compared with a desired flow rate by a conventional comparing control circuit, which in turn produces a valve operating signal. In response to this signal, the valve operates so that the flow rate detected by the flowmeter 2 becomes the desired flow rate.

Figure 7A:
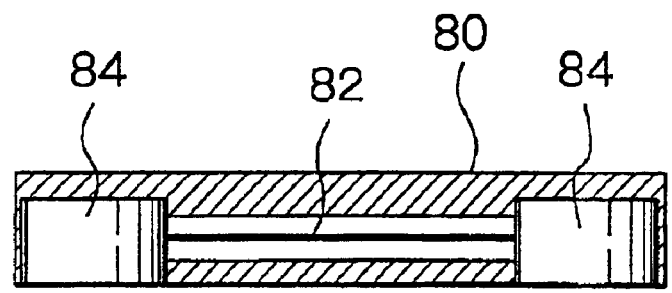
FIG. 7a is a cross-sectional view of a sensor unit of a mass flow controller of the present invention, taken along the line I—I in FIG. 7b.
Figure 7B:
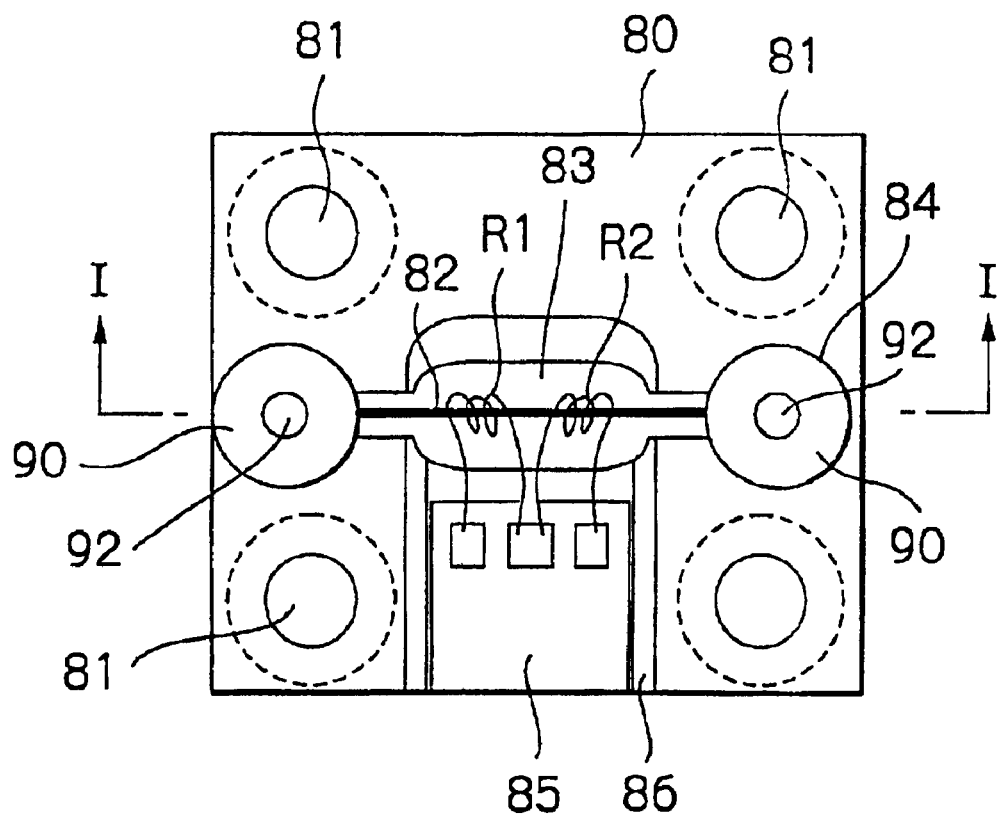
FIG. 7b is a plan view of the sensor unit.
Figure 8:
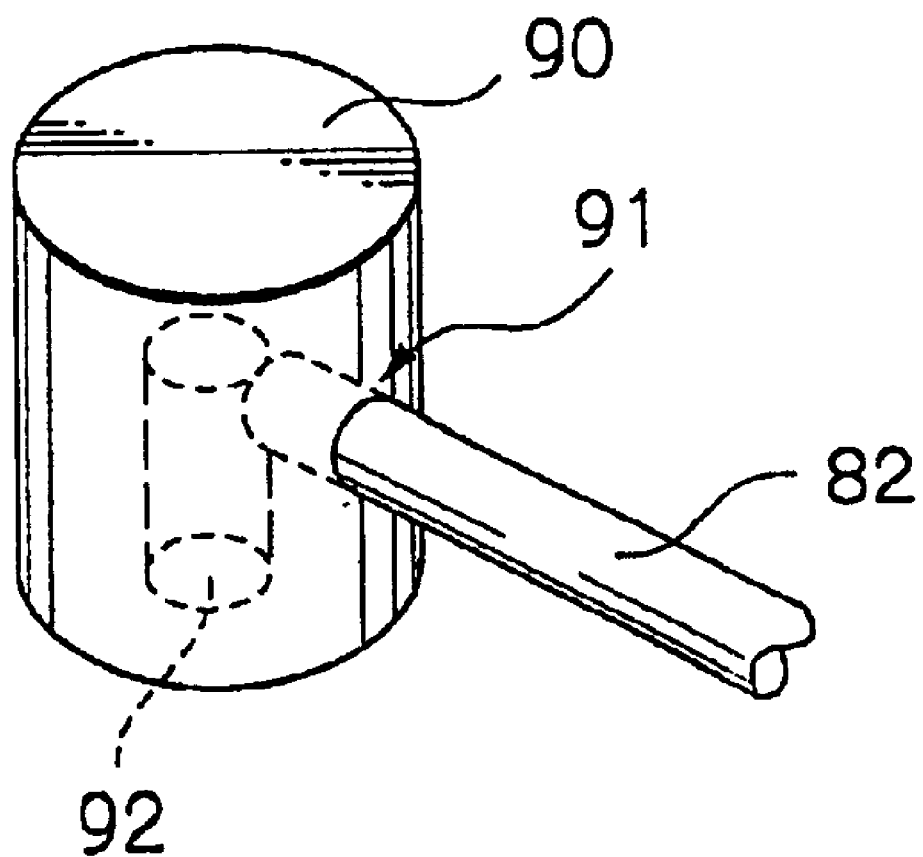
FIG. 8 is a perspective view showing an example of an essential part of the sensor unit of the mass flow controller of the present invention.

Next, referring to FIGS. 7a to 8, the sensor unit 8 is described. The sensor unit 8 includes openings 81 formed at four corners of a platy metal piece 80, through which the bolts 113 extend. A slot-like space 83 is formed at a central portion of the metal piece 80 so as to accommodate the sensor tube 82. A cylindrical cavity 84 having a bottom and communicated with the space 83 is formed at each lateral side of the space 83. A recess 86 is formed on a front side of the space 83 so as to accommodate leads 85 connected to heating resistors R1 and R2 wound around the sensor tube 82. As shown in FIG. 8, each of opposite ends of the sensor tube 82 wound with the heating resistors R1 and R2 is inserted into a hole 91 of a cylindrical piece 90 and fixed therein. The hole 91 extends from a side wall to a central portion of the cylindrical piece 90. The cylindrical piece 90 also includes a hole 92 extending from a bottom end face to the central portion thereof. The cylindrical pieces 90 having the opposite ends of the sensor tube 82 fixed therein are inserted into the cavities 84. The sensor unit 8 arranged as mentioned above is fixed to the sensor fixing members 61 by means of the bolts 113, as shown in FIG. 6. The holes 92 of the cylindrical pieces 90 and the sensor inlet and outlet openings 32 and 33 of the sensor conduit 1' are communicated with each other, while being sealed by the O-rings 34 relative to the outside.

As a functional block of the mass flow controller of the present invention, use can be made of the functional block disclosed in Japanese Patent Application No. 2000-370713. As a circuit structure of the mass flow rate sensor, use can be made of the circuit structure disclosed in Japanese Patent Application No. 2000-356726.

In the above-mentioned arrangement, when the solenoid 21 is energized, a magnetic flux generated by the solenoid 21 passes from the case cover 31 on one side of the solenoid case 29 through the valve conduit 1, the plunger 30 and the gap between the plunger 30 and the yoke 20, and returns from the yoke to the other side of the solenoid case 29. In this instance, the plunger 30 is attracted toward the yoke 20 against the force of the leaf spring 50. The distance between the valve head 4 attached to the forward end of the plunger 30 and the valve seat 18 varies, in accordance with the strength of a current applied to the solenoid 21. Thus, the valve head 4 and the valve seat 18 serve as a control valve for obtaining an arbitrary flow rate.

As has been described above, in the above-mentioned embodiment, main components of the mass flow controller, such as the valve, the valve conduit, the plunger, the yoke, the sensor conduit and the bypass for generating a laminar flow, are longitudinally connected and a fluid flow path for effecting one-way flow of a fluid extend through these components. Therefore, reduction in size and weight of the mass flow controller can be achieved. Further, a fluid base portion formed by cutting a block of metal is not used, so that the mass flow controller can be produced at low cost. Further, the fluid flow path extends in a direction of the axes of the cylindrical valve conduit 1 and the cylindrical sensor conduit 1', so that there is no space in which the fluid stagnates and the problem of contamination can be prevented.

Figure 9:
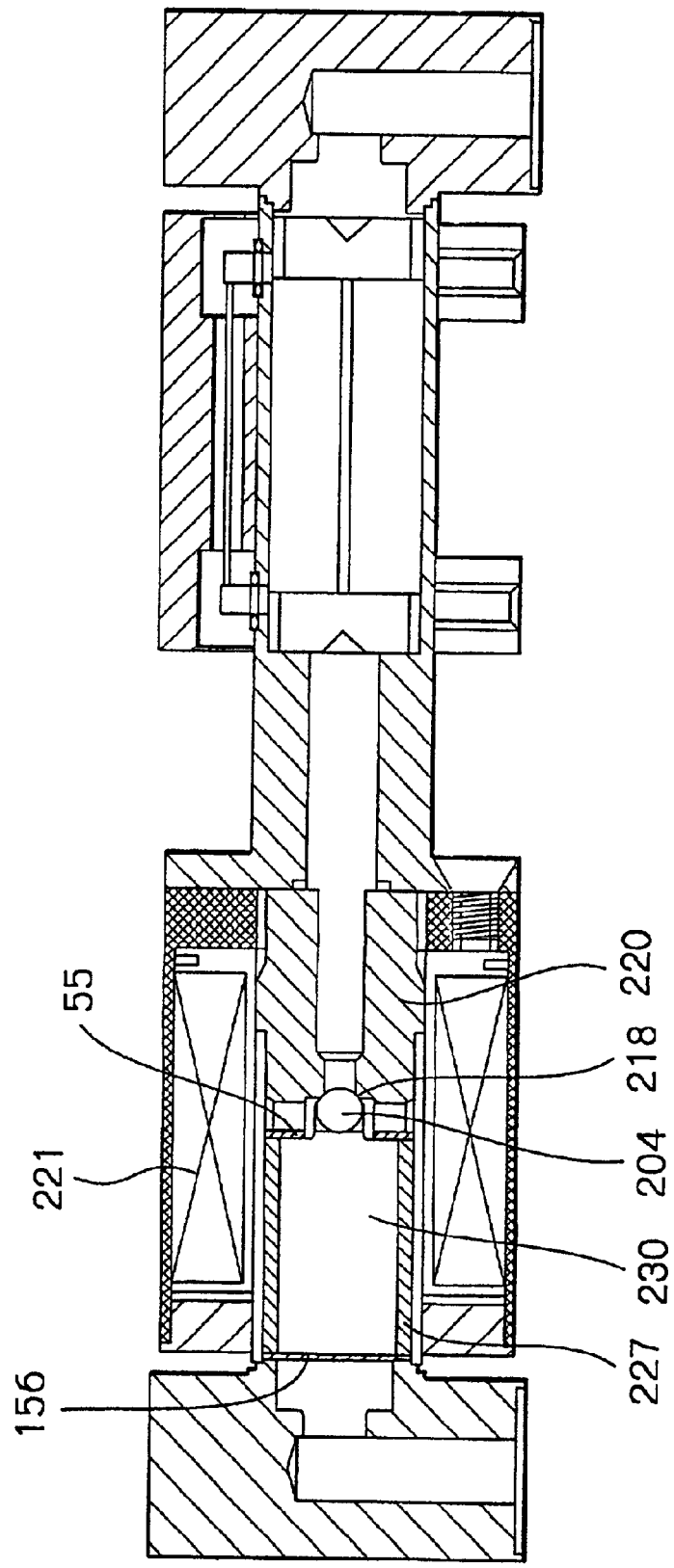
FIG. 9 is a side cross-sectional view of a mass flow controller in a second embodiment of the present invention.
Figure 10:
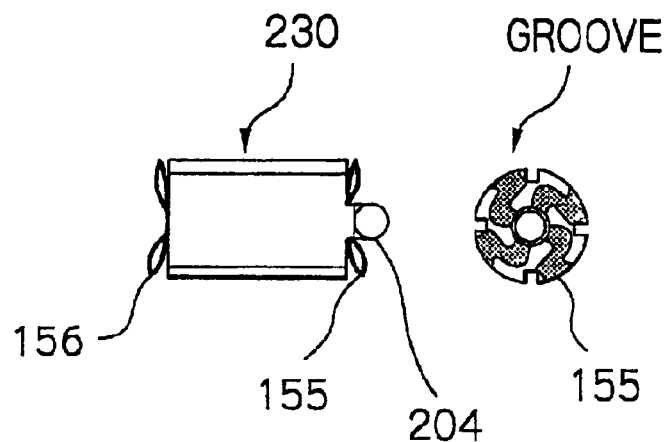
FIG. 10 is a detailed view of a plunger in the second embodiment of the present invention.
Figure 11:
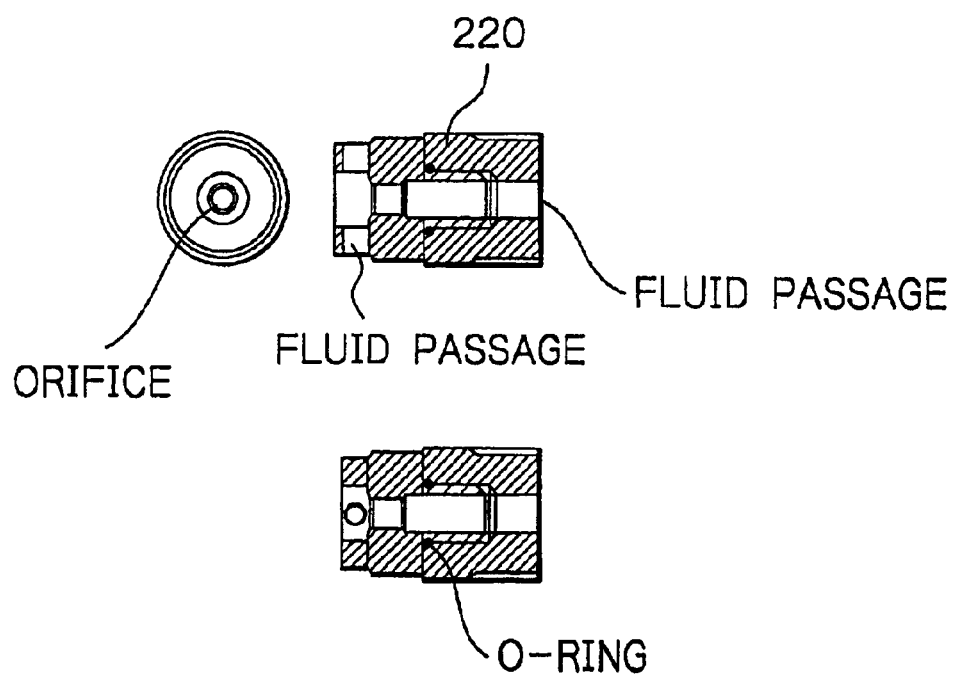
FIG. 11 is a detailed view of a yoke in the second embodiment of the present invention.

FIG. 9 is a cross-sectional view showing a second embodiment of the present invention. A general structure of the mass flow controller in the second embodiment is similar to that shown in the first embodiment. In the second embodiment, a recess is formed in a surface of a yoke 220 on a side thereof facing a plunger 230, and a funnel-like orifice 218 is formed at a central portion of the recess. Holes providing a fluid flow path are formed in a side surface of the recess so as to effect a smooth flow of a fluid from the plunger 230. As shown in detail in FIGS. 10 and 11, a valve head 204 of the plunger 230 is connected, by welding, to a corrugated leaf spring 155 at a central opening thereof formed so that the valve head is held therein. The valve head 204 is disposed so as to face the orifice 218. An end face of the plunger 230 on a side thereof opposite the leaf spring 155 is connected, by welding, to a corrugated leaf spring 156 for holding the plunger 230 in a coaxial relationship to a valve conduit 227.

When a solenoid 221 is energized, the plunger 230 is attracted toward the yoke 220 against the force of the leaf spring 155 provided at the valve head 204, and thus moves in a direction for closing the orifice 218. The degree of opening of the orifice 218 is arbitrarily controlled by the strength of a current applied to the solenoid 221. Thus, the solenoid valve operates as a normally opened control valve.

In a normally opened valve of a solenoid type which is conventionally used in a semiconductor manufacturing apparatus, a valve operation is reversed by using a stem rod. Therefore, the structure of the valve is complicated and a large dead space is formed in a fluid flow path. Due to these drawbacks, the normally opened valve is not so commonly used as compared to a normally closed valve. However, the normally opened valve in this embodiment of the present invention does not have such drawbacks.

Figure 12:
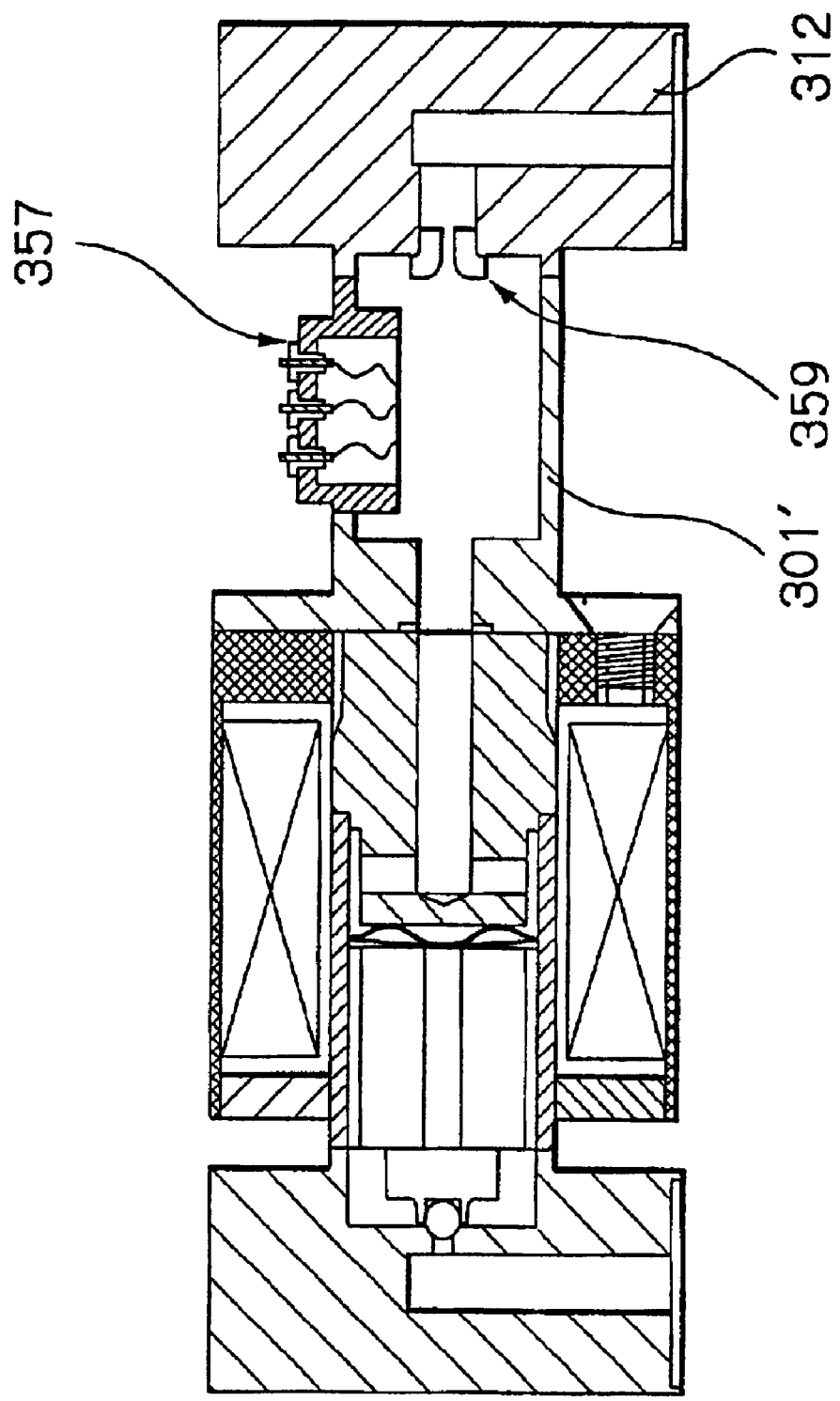
FIG. 12 is a side cross-sectional view of a mass flow controller in a third embodiment of the present invention.

FIG. 12 is a cross-sectional view showing a third embodiment of the present invention. This embodiment is characterized in that a pressure gauge 357 which is a pressure-sensitive sensor is provided as a means for detecting a flow rate and a nozzle 359 is provided at a fluid outlet portion 312. The pressure gauge 357 is a small, semiconductor gauge type sensor provided so as to form part of a sensor conduit 301'. A flow rate is detected by detecting an increase in pressure in the nozzle 359, which is generated according to the flow rate. The remaining components of the mass flow controller are substantially the same as those in the first and second embodiments.

In this embodiment, accuracy of the sensor is affected by a valve outlet pressure. However, in applications in which an outlet side of the valve is maintained under high vacuum, detection of a mass flow rate can be conducted with an accuracy satisfactory in practice. Further, in this embodiment, the mass flow controller can be further reduced in size while eliminating dead space in which a fluid stagnates.

Figure 13:
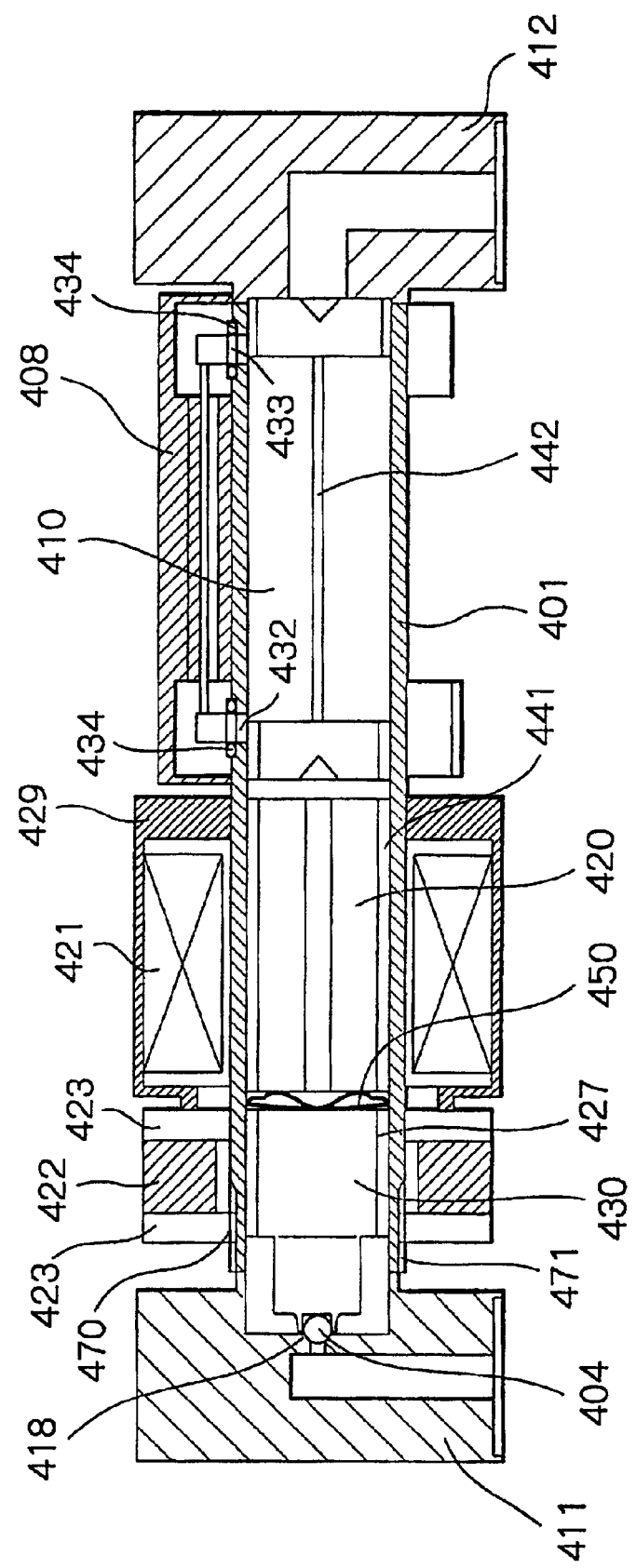
FIG. 13 is a side cross-sectional view of a mass flow controller in a fourth embodiment of the present invention.
Figure 14:
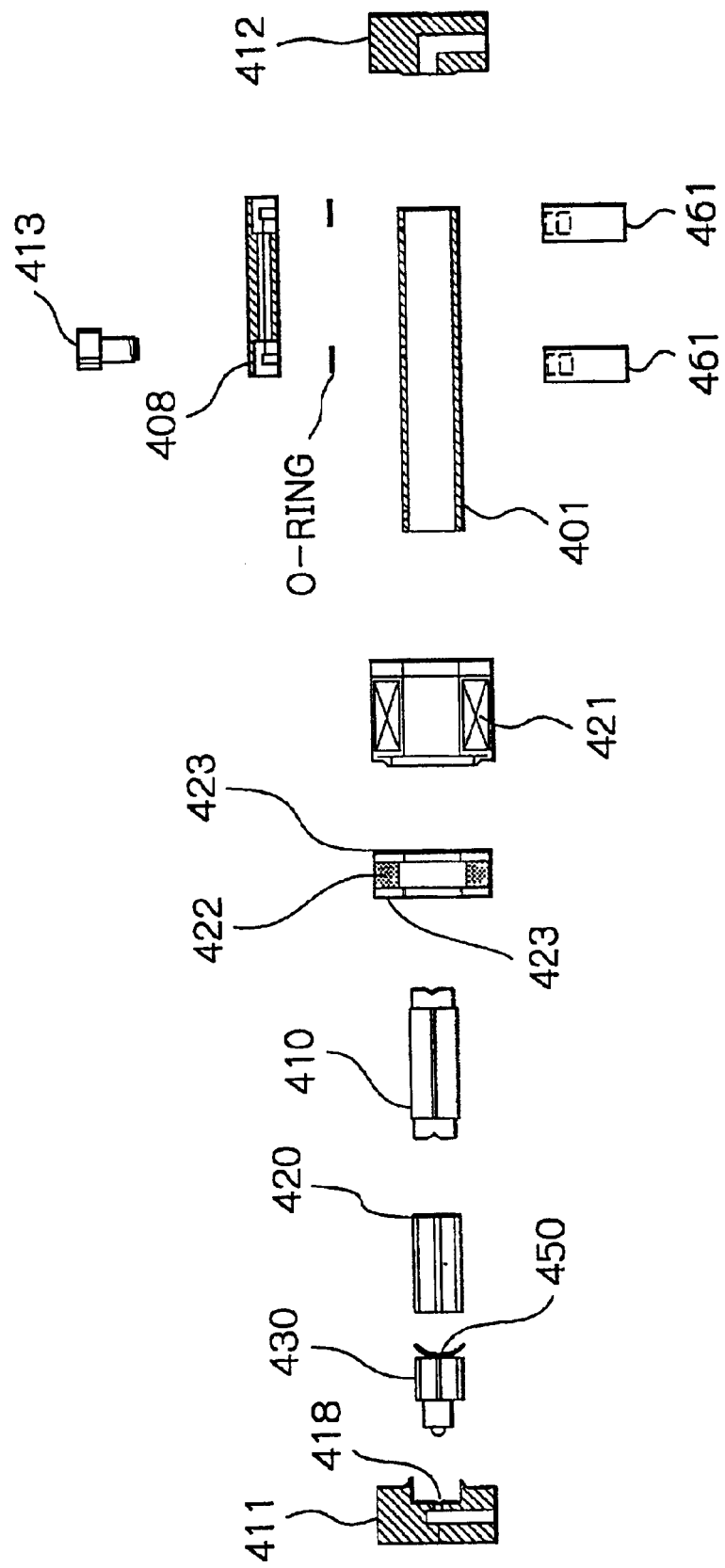
FIG. 14 is a disassembled view of the mass flow controller in the fourth embodiment of the present invention.

FIGS. 13 and 14, respectively, show a side cross-sectional view and a disassembled view of a mass flow controller in a fourth embodiment of the present invention. In this embodiment, a pair of connecting flanges 411 and 412 providing the fluid inlet and outlet portions are connected to a cylindrical conduit 401 by welding. A cylindrical plunger 430 providing the movable portion of the solenoid valve is disposed in the conduit 401 on a side of the fluid inlet portion in a coaxial relationship to the conduit 401. A plurality of grooves 427 are axially formed in a cylindrical surface of the plunger 430. The grooves 427 serve to effect a smooth flow of a fluid and prevent occurrence of a turbulent flow when a fluid flows at a high velocity, thus ensuring a stable movement of the plunger 430.

A single doughnut-like permanent magnet 422 is provided at an outer circumferential surface of the conduit 401 in a coaxial relationship to the conduit 401 at a position corresponding to the plunger 430. The doughnut-like permanent magnet 422 has an inner diameter larger than an outer diameter of the conduit 401 by several mm and is sandwiched with doughnut-like magnetic rings 423. Each magnetic ring 423 has an outer diameter equal to that of the permanent magnet 422 and an inner diameter such that it makes contact with the outer circumferential surface of the conduit 401. The doughnut-like permanent magnet 422 is axially magnetized and a magnetic flux from one pole of the permanent magnet 422 passes through one magnetic ring 423, the plunger 430 in the conduit 401 and the other magnetic ring 423, and returns to the other pole of the permanent magnet 422. Consequently, the plunger 430 is held in a coaxial relationship to the doughnut-like permanent magnet 422. In this instance, a force which is to hold the plunger in a coaxial relationship to the permanent magnet 422 is equal to the square of an amount of displacement of the plunger relative to the center axis of the permanent magnet 422 when the amount of displacement is small. This is suitable when the plunger is operated as the solenoid valve.

A solenoid case 429 is disposed on one side of the permanent magnet 422, which is sandwiched with the magnetic rings 423, in a coaxial relationship to the conduit 401. The solenoid case 429 on a side of the permanent magnet 422 is bent so as to form a space between an outer circumferential surface thereof and the magnetic ring 423, and makes magnetic contact with a radially inner side of the magnetic ring 423. This prevents a situation wherein the magnetic flux from the doughnut-like permanent magnet 422 leaks toward the solenoid 421 and the plunger 430 receives a force acting toward the fluid outlet portion when the solenoid 421 is deenergized.

The magnetic rings 423 holding the doughnut-like permanent magnet 422 therebetween partially include a threaded portion 470 on an inner circumferential side thereof so that the plunger 430 can be adjusted and fixed to an arbitrary initial position from outside the conduit 401. The threaded portion 470 is threadably engaged with a corresponding threaded portion 471 formed in the conduit 401. Fine adjustment of the position of the plunger 430 in the conduit 401 can be conducted by adjusting the position of the permanent magnet 422 by means of these threaded portions.

The plunger 430 is made of a magnetic alloy having high anti-corrosion properties and has a spherical valve head 404 fixed to one end thereof. The other end of the plunger 430 is connected, by welding, to a corrugated leaf spring 450 for holding the plunger 430 in a coaxial relationship to the conduit 401. Further, a cylindrical magnetic member 420 providing the yoke for the solenoid valve is press-fitted into the conduit 401 in proximity to the plunger 430 on a side of the fluid outlet portion. A plurality of axial grooves 441 are formed in an outer circumferential surface of the yoke 420, to thereby provide fluid flow paths. An end portion of the solenoid case 429 on a side thereof opposite the permanent magnet 422 is fixed at a position corresponding to one end of the yoke 420 in the conduit 401.

When the solenoid 421 is energized, due to a magnetic flux of the solenoid 421, the plunger 430 is attracted toward the yoke 420. An orifice in a funnel-like form providing a valve seat 418 is formed in the flange 411 as the fluid inlet portion. The position of the doughnut-like permanent magnet 422 over the conduit 401 is adjusted and fixed so that the valve head 404 of the plunger 430 is pressed against the valve seat 418 when the solenoid 421 is deenergized.

When flow of a fluid is effected, the solenoid 421 is energized so as to move the plunger 430 in a direction away from the valve seat 418 to an arbitrary position.

A cylindrical bypass 410 is press-fitted into the cylindrical conduit 401 in a coaxial relationship on a side of the fluid outlet portion. Axial grooves 442 are formed in a surface of the cylindrical bypass 410 so as to generate a laminar flow of a fluid. A sensor inlet opening 432 and a sensor outlet opening 433 are formed in a side surface of the conduit 401 at a position in which the cylindrical bypass 410 is provided, so as to enable a part of the flow of the fluid to be branched off toward a flow rate sensor unit 408. The flow rate sensor unit 408 is a thermal mass flow rate sensor and is fixed on the conduit 401 through O-rings 434 so that a flow path in the sensor unit communicates with the sensor inlet opening 432 and the sensor outlet opening 433. The flow rate sensor unit 408 is fixed in the same manner as in the case of the sensor unit in the first embodiment. That is, the conduit 401 is surrounded by U-shaped fittings and the flow rate sensor unit 408 is fixed to the U-shaped fittings by means of nuts.

Figure 15:
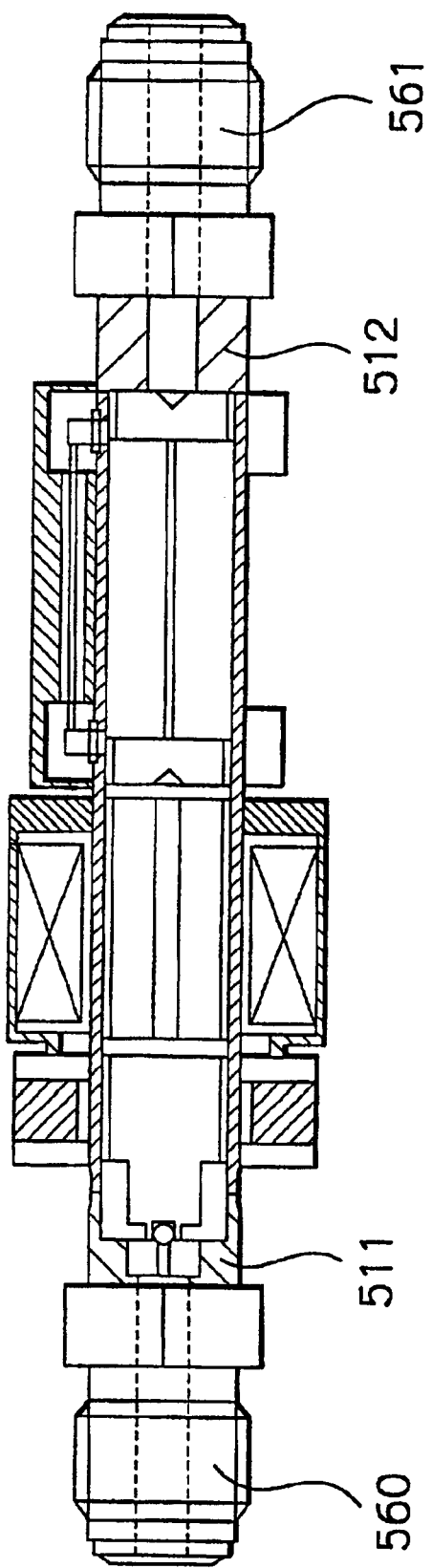
FIG. 15 is a side cross-sectional view of a mass flow controller in a fifth embodiment of the present invention.

FIG. 15 is a side cross-sectional view showing a fifth embodiment of the present invention. In this embodiment, conventional joint members 560 and 561 are connected to a fluid inlet portion 511 and a fluid outlet portion 512 by welding. The orifice portion is press-fitted into the joint member 560 on a side of the fluid inlet portion.

Figure 16:
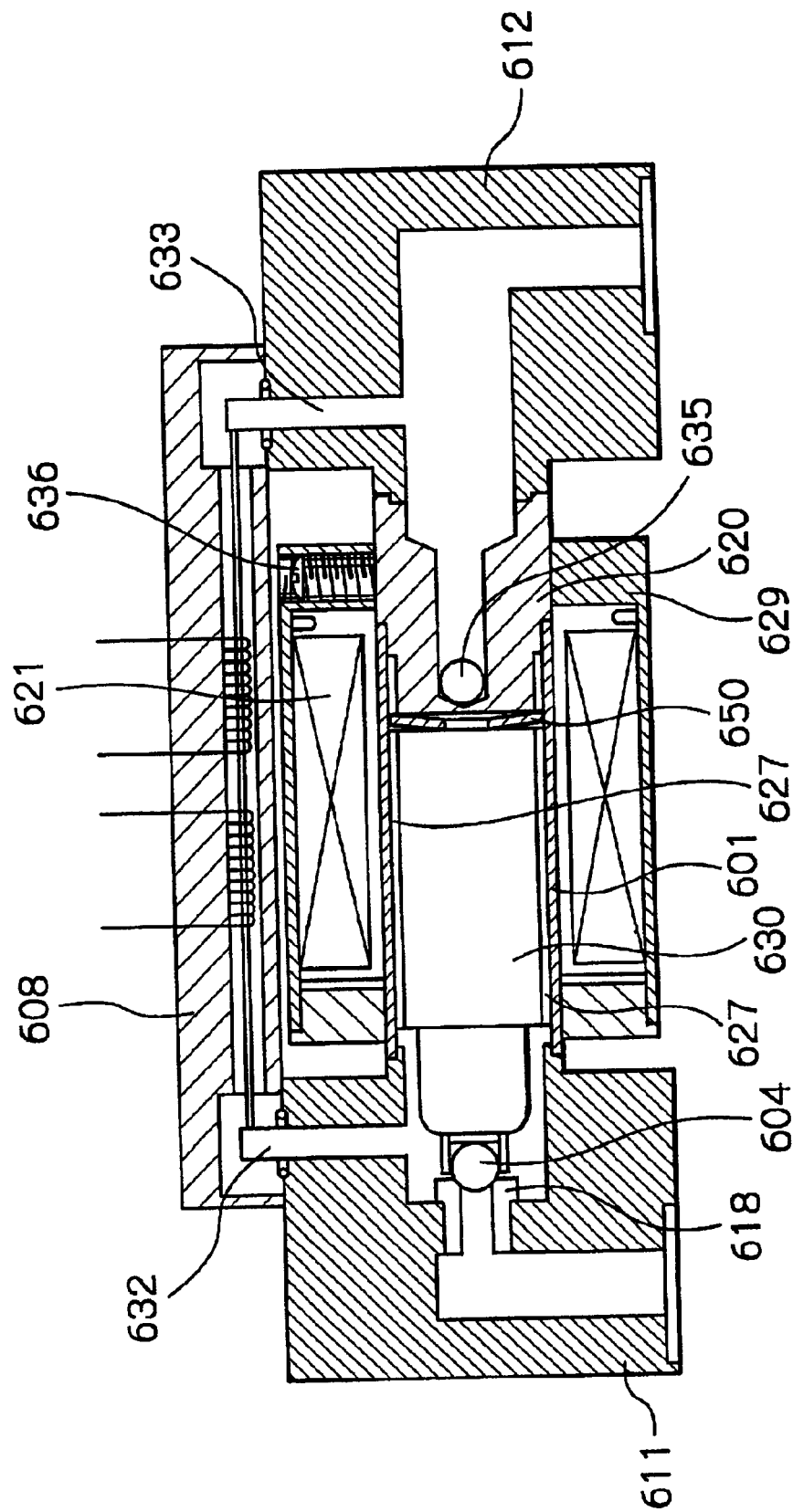
FIG. 16 is a side cross-sectional view of a mass flow controller in a sixth embodiment of the present invention.

FIG. 16 is a side cross-sectional view showing a sixth embodiment of the present invention. In this embodiment, as compared to the embodiment of FIG. 1, the cylindrical bypass 10 for generating a laminar flow is not provided, and a plunger 630 serves to generate a laminar flow. Therefore, a mass flow rate sensor unit 608 is disposed in parallel to the plunger 630. In FIG. 16, a pair of connecting flanges 611 and 612 providing the fluid inlet and outlet portions are connected to a cylindrical conduit 601 by welding. The plunger 630 in a cylindrical form providing the movable portion of the solenoid valve is disposed in the conduit 601 on a side of the fluid inlet portion in a coaxial relationship to the conduit 601. A plurality of grooves 627 are axially formed in a cylindrical surface of the plunger 630. The grooves 627 serve to effect a smooth flow of a fluid and prevent occurrence of a turbulent flow when a fluid flows at a high velocity, thus ensuring a stable movement of the plunger 630.

On an outer circumferential surface of the cylindrical conduit 601, there is provided a solenoid case 629 at a position substantially corresponding to the position of the plunger 630 in a coaxial relationship to the conduit 601. The plunger 630 is made of a magnetic alloy having high anti-corrosion properties and has a spherical valve head 604 fixed to one end thereof. The valve head 604 is disposed in a state such that it abuts against a valve seat 618 formed at the inlet-side flange 611 or faces the valve seat 618 with a gap being provided therebetween, so as to control a flow rate of a fluid. The other end of the plunger 630 is connected, by welding, to a corrugated leaf spring 650 for holding the plunger 630 in a coaxial relationship to the conduit 601. Further, a cylindrical magnetic member 620 providing the yoke for the solenoid valve is press-fitted into the conduit 601 in proximity to the plunger 630 on a side of the fluid outlet portion. A radial hole 635 is formed in the yoke 620, so as to guide the fluid into the outlet-side flange 612. An adjusting screw 636 is threadably engaged with an end portion of the solenoid case 629 on a side of the fluid outlet portion, so as to adjust an axial position of the yoke 620 and fix the yoke 620 at the adjusted position.

In order to measure a flow rate of a fluid flowing through a fluid flow path, a thermal mass flow rate sensor unit 608 is disposed in parallel to the fluid flow path. A sensor inlet opening 632 is formed in the inlet-side flange 611, so as to enable a part of the flow of the fluid to be branched off toward the sensor unit 608. A sensor outlet opening 633 is formed in the outlet-side flange 612, so as to guide the fluid from the sensor unit 608 into the outlet-side flange 612. The function of the thermal mass flow rate sensor unit 608 is the same as those of the sensor units shown in FIGS. 1, 9, 13 and 15.

When the solenoid 621 is energized, due to a magnetic flux of the solenoid 621, the plunger 630 is attracted toward the yoke 620 against the force of the leaf spring 650. When the solenoid 621 is deenergized, the valve head 604 is brought into abutment against the valve seat 618, to thereby close the solenoid valve.

By this arrangement in the sixth embodiment, an element for generating a laminar flow can be omitted, so that a mass flow controller further reduced in size can be obtained.

Figure 17:
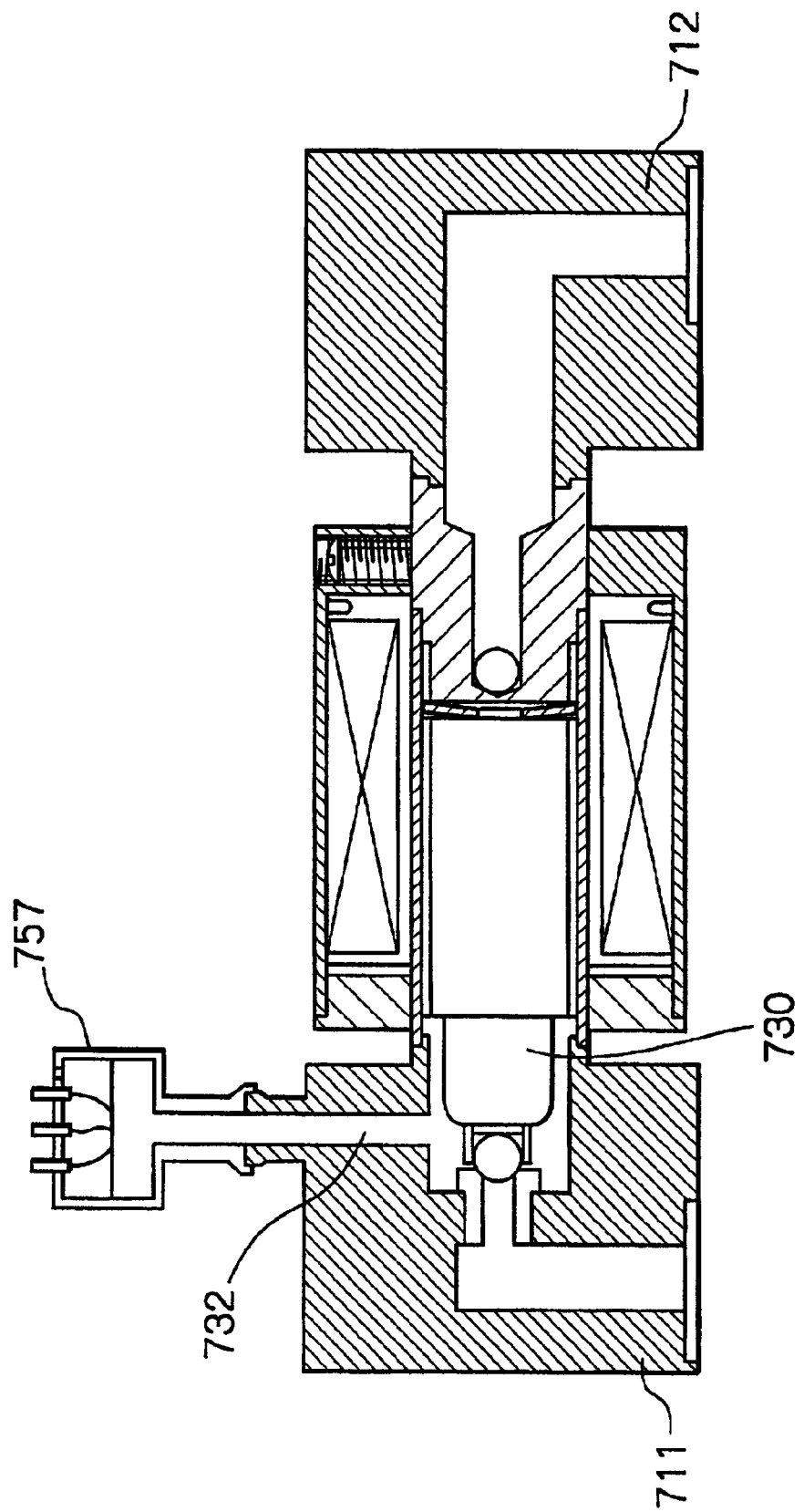
FIG. 17 is a side cross-sectional view of a mass flow controller in a seventh embodiment of the present invention.

FIG. 17 is a side cross-sectional view showing a seventh embodiment of the present invention. As compared to the embodiment of FIG. 16, the seventh embodiment is characterized in that a pressure gauge 757 as a pressure-sensitive sensor is provided to detect a flow rate. In this embodiment, a sensor conduit 732 is provided at a part of a fluid flow path in an inlet-side flange 711, which flow path guides the fluid to a plunger 730. The pressure gauge 757 is a small, semiconductor gauge type sensor. A flow rate is detected by detecting an increase in pressure in the fluid flowing in a space between the valve plunger and the conduit, which is generated according to the flow rate. The remaining components of the mass flow controller are substantially the same as those in the sixth embodiment.

In the seventh embodiment, a mass flow controller which is further reduced in size and which includes no dead space can be obtained.

As has been described above, the present invention provides a mass flow controller for controlling a mass flow rate in a predetermined range, in which a mass flow rate of a fluid is detected by a flow rate sensor and a control valve is operated so as to adjust the detected mass flow rate to a desired value. In the mass flow controller of the present invention, a fluid flow path is formed by a cylindrical conduit and the control valve is arranged as a solenoid valve operated by means of a solenoid. A plunger for opening and closing the solenoid valve is disposed within the cylindrical conduit, whereby one-way flow of the fluid is effected in a space between an outer circumferential surface of the plunger and an inner circumferential surface of the conduit in a direction of the axis of the cylindrical conduit. By this arrangement, a compact and lightweight mass flow controller can be produced at low cost, while eliminating dead space in a conduit of the mass flow controller, thus preventing any fluid from stagnating.

In the mass flow controller of the present invention, the outer circumferential surface of the plunger may include a groove extending in parallel to the axis of the conduit, to thereby provide a fluid flow path. By this arrangement, it is possible to prevent occurrence of a turbulent flow when a fluid flows along a side surface of the plunger, so that a stable movement of the plunger can be ensured and the mass flow controller has good controllability.

In the present invention, the plunger may be made of a magnetic alloy having high anti-corrosion properties. By this arrangement, occurrence of contamination in the mass flow controller can be suppressed.

In the present invention, the control valve may comprise a spherical valve head attached to a forward end of the plunger and a valve seat arranged in a funnel-like form. By this arrangement, the axis of the plunger is unlikely to be displaced when a fluid flows along the side surface of the plunger. Therefore, a stable valve closing operation can be always performed in the mass flow controller.

In the mass flow controller of the present invention, a cylindrical yoke for guiding a magnetic flux generated by the solenoid may be disposed in the conduit at a position adjacent to the plunger, which yoke is movable in the direction of the axis of the conduit, whereby an initial position of a valve head of the solenoid valve can be adjusted by adjusting a gap between the plunger and the yoke. By this arrangement, a mass flow controller having a low flow rate, of which controllability is easily affected by the distance between the valve seat and the valve head and which is difficult to manufacture using conventional techniques, can be easily produced.

In the mass flow controller of the present invention, a spherical valve head attached to one end of the plunger and a yoke having a funnel-like valve seat may be disposed adjacent to each other with a spring being provided therebetween, to thereby obtain a normally opened valve structure. By this arrangement, a normally opened valve structure which is compact and has no dead space can be obtained.

In the present invention, a doughnut-like permanent magnet may be positioned at an outer circumferential surface of the conduit at a position corresponding to the plunger, which doughnut-like permanent magnet is adjustable with respect to the direction of the axis of the conduit, whereby an initial axial position of the plunger when the solenoid is deenergized can be adjusted by adjusting the doughnut-like permanent magnet. By this arrangement, the initial position of the plunger can be easily adjusted from outside the conduit.

Therefore, a mass flow controller having a low flow rate, of which controllability is easily affected by the distance between the valve seat and the valve head and which is difficult to manufacture using conventional techniques, can be easily produced.

The mass flow controller of the present invention may further comprise a cylindrical bypass means provided in the conduit. The bypass means comprises a fluid flow path extending in the direction of the axis of the conduit and a bypass passage bypassing the fluid flow path. The bypass passage is connected to a thermal mass flow rate sensor. By this arrangement, the flow of fluid is made linear and loss in pressure in the mass flow controller can be suppressed.

In the present invention, the flow rate sensor may be arranged as a pressure-sensitive sensor and the mass flow controller may further comprise a nozzle provided at a fluid outlet portion thereof and a pressure gauge for detecting a change in pressure due to a change in flow rate at the nozzle. By this arrangement, a compact mass flow controller can be obtained.

What is claimed is:

1. A mass flow controller for controlling a mass flow rate, in which a mass flow rate of a fluid is detected by a flow rate sensor and a control valve is operated so as to adjust the detected mass flow rate to a desired value, wherein said control valve is arranged as a solenoid valve operated by means of a solenoid, and a plunger for opening and closing said solenoid valve is disposed within a cylindrical conduit having a hollow structure, whereby one-way flow of the fluid is effected in a space between an outer circumferential surface of the plunger and an inner circumferential surface of the conduit in a direction of the axis of the cylindrical conduit, wherein a cylindrical yoke for guiding a magnetic flux generated by the solenoid is disposed in the conduit at a position adjacent to said plunger, said yoke being adjustable with respect to the direction of the axis of the conduit, whereby an initial gap between the plunger and the yoke can be adjusted.

2. The mass flow controller according to claim 1, wherein the outer circumferential surface of said plunger includes a groove extending in parallel to the axis of the conduit, to thereby provide a fluid flow path.

3. The mass flow controller according to claim 2, wherein the plunger is made of a magnetic alloy having high anti-corrosion properties.

4. The mass flow controller according to claim 1, wherein said control valve comprises a spherical valve head attached to a forward end of the plunger and a valve seat corresponding to said valve head, said valve seat being arranged in a funnel-like form.

5. The mass flow controller according to claim 3, wherein said control valve comprises a spherical valve head attached to a forward end of the plunger and a valve seat corresponding to said valve head, said valve seat being arranged in a funnel-like form.

6. The mass flow controller according to claim 1, wherein a spherical valve head is attached to one end of said plunger and a yoke having a funnel-like valve seat corresponding to said valve head is disposed adjacent to said plunger with a spring being provided therebetween, to thereby obtain a normally opened valve structure.

7. The mass flow controller according to claim 1, a doughnut-like permanent magnet is positioned at an outer circumferential surface of said conduit at a position corresponding to said plunger, said doughnut-like permanent magnet being adjustable with respect to the direction of the axis of the conduit, whereby an initial axial force between said plunger and valve seat can be adjusted by the position of said doughnut-like permanent magnet.

8. The mass flow controller according to claim 1, wherein the flow rate sensor comprises a pressure based flow rate sensor provided in a fluid flow path, so as to detect a pressure generated by the fluid flowing in the space between the outer circumferential surface of the plunger and the inner circumferential surface of the conduit.

9. The mass flow controller according to claim 8, wherein the pressure based flow rate sensor comprises a nozzle provided at a fluid outlet portion of the mass flow rate controller and a pressure gauge for detecting a pressure generated by the fluid flow at said nozzle.

10. The mass flow controller according to claim 8, wherein a conduit for detection of pressure is provided at a fluid inlet portion of said fluid flow path, which fluid inlet portion guides the fluid to the plunger, and wherein said pressure based flow rate sensor is provided in said conduit for detection of pressure so as to determine a flow rate, based on a pressure generated by the flow of the fluid along the plunger.

11. A mass flow controller for controlling a mass flow rate, comprising:

a cylindrical conduit having a hollow structure;

a solenoid valve comprising a solenoid disposed at an outer circumferential surface of said cylindrical conduit and a cylindrical plunger disposed in said cylindrical conduit so as to extend in a direction of the axis of the cylindrical conduit, said plunger being adapted to be operated by means of said solenoid;

a flow rate sensor for detecting a mass flow rate;

a valve head attached to a forward end of said plunger, said valve head providing a control valve in cooperation with a valve seat facing the valve head, said plunger being adapted to be operated so as to obtain mass flow rate, in accordance with a mass flow rate detected by said flow rate sensor;

a groove formed in an outer circumferential surface of said plunger, said groove extending in the direction of the axis of the cylindrical conduit, so as to effect one-way flow of a fluid in a space between said groove and an inner circumferential surface of said cylindrical conduit in the direction of the axis of the cylindrical; and a cylindrical yoke for guiding a magnetic flux generated by the solenoid, said yoke being disposed in the cylindrical conduit at a position adjacent to said plunger, said yoke being adjustable with respect to the direction of the axis of the cylindrical conduit, whereby an initial gap between the plunger and the yoke can be adjusted.

12. A mass flow controller for controlling a mass flow rate, in which a mass flow rate of a fluid is detected by a flow rate sensor and a control valve is operated so as to adjust the detected mass flow rate to a desired value, wherein said control valve is arranged as a solenoid valve operated by means of a solenoid, and a plunger for opening and closing said solenoid valve is disposed within a cylindrical conduit having a hollow structure, whereby one-way flow of the fluid is effected in a space between an outer circumferential surface of the plunger and an inner circumferential surface of the conduit in a direction of the axis of the cylindrical conduit, wherein the flow rate sensor comprises a thermal mass flow rate sensor connected in parallel with the conduit, and wherein a fluid inlet portion of the thermal mass flow rate sensor is connected to a fluid inlet portion formed at an end of the plunger and a fluid outlet portion of the sensor is connected to a fluid outlet portion formed at the other end of the plunger.

* * * * *